Patented Mar. 28, 1939

2,152,602

UNITED STATES PATENT OFFICE

2,152,602

FOOD PRODUCT

Emil Ott, Wilmington, Del., assignor to Hercules Powder Company, Wilmington, Del., a corporation of Delaware No Drawing. Application June 9, 1937,
Serial No. 147,385

13 Claims. (Cl. 99—150)

This invention relates to a process for rendering food products resistant to staling and to the product thereof.

Food products possess their best characteristic taste, including aroma and flavor, and condition at some recognized time. As to some products this time coincides with the completion of their production or preparation, such as, for example, the completion of the baking of a bakery product, or the cooking of a cooked food product, or the roasting of a roasted food product, or the ripening of a fruit or vegetable. As to other products, they possess their most preferred taste and condition at a time arrived at as a result of ageing or curing. Moreover, various food products are at their best at the time they are removed from their natural enclosure or opened, as in the case of opening of shell fish or the peeling of fruit or the shelling of nuts, etc.

Certain food products begin at once or very soon after attaining their most preferred taste and condition, or after being deprived of their natural protection, to lose that perfection of taste and condition. Such loss of taste and condition is a change which is well recognized in respect of food products and is termed staling. The question of staleness or freshness involves many elements of taste and condition and is not completely definable but is clearly evidenced by a variety of definite factors including, among others, loss of the perfection of flavor and aroma or taste and condition; a pronounced flatness or insipidness of taste and flavor; a definite unpleasantness of taste or odor; rancidity, decomposition or putrefaction; alteration in appearance, such as, for example, the undesirable change in crumb structure and general shrinkage that occur in bakery products of which cake is an important example; or a combination of such factors.

It is an object of this invention to provide a process whereby food products which are normally subject to staling are rendered resistant to a high degree to such staling, and to provide food products, normally subject to staling, which are substantially resistant to staling, the staling referred to being especially, but not exclusively, such as is incident to oxidation.

In the practice of this invention there is added to or incorporated in a food product that is normally subject to staling, a staling-resistant or anti-staling agent, and the product is a food product that is resistant to staling. Obviously, the retention of its original perfection of taste and condition by the product of this invention is not perpetual, but with the benefit of usual precautions, especially such precautions as preventing loss of moisture and contamination from external sources, the product of this invention remains useful, and usually as desirable as when first prepared, for periods many times as long as does the same product prepared without the use of this invention.

The staling-resistant or anti-staling agent does not impair the natural or original taste of the food product. If it is added in the form of a solution or dispersion in liquid, as is preferable inasmuch as effective distribution throughout the food product is thereby facilitated, the liquid is preferably water but should be one that imparts no undesirable characteristic to the product. It is preferably miscible with or dispersable in such liquid as is normally present in any product to which it is added. It may be added to some products by being included, as in the form of a solution, in the ingredients mixed to produce the products, as in making cake or bread. It may be added to other products by application to the surface thereof, in which case it is preferably so selected and put into such condition that it will be absorbed by or infused or dissolved in the product or will otherwise penetrate the product. It may be worked into the food product. It may or may not be added before the completion of the preparation of the product and may or may not be altered in the treatment to which the product is subjected, such as completion of the preparation of the product for use, so long as any such alteration does not destroy the effectiveness of the staling-resistant. It is preferably substantially non-volatile at the temperatures to which the product is subjected after the staling-resistant is added thereto. It is, considering it as a whole and as associated with the food product treated, sufficiently non-toxic to be continuously consumable in the food product when present in effective proportions. In the practice of this invention the staling-resistant or anti-staling agent may consist of one of the substances of the class or classes herein mentioned, or of a mixture of two or more of such substances, or a mixture of one or more of such substances with one or more other substances that may or may not have staling-resistant or anti-staling properties; and the agent may or may not consist of or include a non-toxic proportion of one or more substances, whether or not they are within the class or classes herein mentioned, that would be toxic in other proportions or in another environment.

It has heretofore been proposed to add preservatives to foods, such as the addition of formaldehyde to milk, to retard souring thereof, and the addition of fermentation preventative, such as benzoate of soda, to fruit and vegetable products, especially fruit juices and catsup, to curb undesired fermentation thereof. And, it has been proposed to pickle food products in liquids, such as brine, to preserve them against decomposition. However, this invention is definitely distinguished from such practices and the resulting products in that, without deleterious or toxic effects and without change or impairment of taste or condition, food products are rendered resistant to loss of flavor and aroma or taste and condition. Such retention of original taste and condition is a result that is different from or additional to the results obtained by the use of such preservatives. Moreover, this invention is not limited to products consisting of or containing liquid or to semi-liquid products, but is adapted also to dry or substantially dry products. For example, it is well known that bakery products, such as bread, rolls and cake, are normally subject to staling and within a few days acquire such degree of staleness as to lose their salability and desirability, but when those products are treated in accordance with this invention and are a product embodying this invention their resistance to staling results in such prolongation of their freshness, taste and desirability that they are in salable and desirable condition substantially longer than the same products, respectively, not treated in accordance with or embodying this invention. Likewise, the period during which crackers retain their desirability is substantially extended. Moreover, canned products of this invention are resistant to the acquisition of the metallic "off-taste" that is characteristic of canned foods; and the use of staling-resistants or anti-staling agent employed which are anti-oxidants does not interfere with the attainment of the effects desired in the baking of bakery products, but, on the contrary, certain of them promote or accelerate the browning of the crust of such products and impart advantages resultant from that effect.

It is impossible to enumerate all characteristics and properties of food products involved in the question of freshness or staleness. However, the foregoing and illustrative examples given below will give an indication of the characteristics involved in the resistance to staleness that is effected by the process of this invention and possessed by the product thereof.

Likewise, it is impossible to enumerate all food products to which the process of the invention applies and which, when rendered resistant to staling, constitute the product of the invention. However, the field of invention is indicated by reference to examples of food products to which it applies. Such examples include food products containing or consisting of liquid, semi-solid food products and both moist and dry solid food products. As a few of the many possible examples of food products falling within the above mentioned classes, mention may be made of bakery products of all kinds and especially those including shortening or fat; cereals; grain flakes; prepared or puffed or dried grain, seeds; prepared seeds such as roasted coffee; dried foods including tea, fruit and vegetables; canned foods; fruit juices; flavoring extracts including artificial vanilla extract; cream; flour; shortenings including so-called substitutes therefor; whole or shelled or dried eggs; butter; salad dressings; the meat of shell fish; fresh, salted and toasted nut meats; fresh fruits and vegetables; vegetable and animal oils; manufactured food products, including sauces and catsup; prepared meat, poultry and fish products; etc.

Moreover, the term food products as herein employed includes animal and vegetable products which are normally subject to staling but which are not necessarily utilized as food although utilized in such manner that taste and condition are matters of concern, examples of such products being tobacco products.

The staling-resistant or anti-staling agent employed in the practice of this invention may consist of one or of a mixture of a wide variety of substances so long as it renders the food product resistant to staling as herein defined and possesses other properties above mentioned. Illustrative examples of substances that may be employed in the practice of this invention are substances meeting the foregoing requirements and which are organic derivatives of ammonia in which at least one organic radical attached to nitrogen contains more than one OH group, or salts of such derivatives. As a rule aliphatic compounds are preferred since it is generally accepted that aromatic derivatives as a class tend to show toxic effects. Among the aliphatic derivatives, any compound capable of leading to the formation of ethylene glycol or oxalic acid may not be considered useful in this invention since they are toxic in the sense that even small amounts of these substances, if frequently eaten, will lead to serious disorders. It is further necessary that the anti-staling compound, in view of the relatively small amounts used, must be quite well dispersed in the food to be protected. Hence, a soluble compound is indicated and in practically all cases solubility in water is to be preferred since water is present in most foods. Even oils and fats used as foods contain appreciable amounts of water. The organic derivatives of ammonia of the class above mentioned tend to show adequate solubility in water provided the molecular weight of the organic residue is not excessive. The choice of such organic derivatives is further narrowed down in that they, when used as a staling preventative, should be non-volatile under the conditions it is subjected to during the preparation of the food. The salts, organic and inorganic, of such organic derivatives are useful and frequently preferable, the salts of saturated and unsaturated higher fatty acids having eight or more carbon atoms, (e. g. stearic and oleic), having a solubility or dispersability in oil that is advantageous in treating oils and fats. Such salts of higher fatty acids also have advantageous dispersability in water.

In view of the fact that polyhydroxy aliphatic compounds, such as glycerin, and a large number of carbohydrates, such as sugars, have been well established to be free from any toxic effects on human beings, being as a rule considered as foods, it is obvious that organic derivatives of ammonia, and salts of such derivatives, the organic part of which is related to the above polyhydroxy compounds, are useful in the practice of this invention. Moreover, the salts of such compounds, such as the hydrochloric acid salts, are in some cases more effective than the free bases.

Among the organic derivatives of ammonia of the class above mentioned (and salts of such derivatives) useful in this invention are products in which the organic part of the derivatives are related, for instance, to polyhydric alcohols such as tri-hydric alcohol (glycerol); tetra-hydric alcohols (erythritol, pentaerythritol); penta-hydric alcohols or pentites; hexa-hydric alcohols (sorbitol, mannitol); and higher hydric alcohols; to mono-saccharides (arabinose, xylose, mannose, glucose, galactose, fructose); disaccharides (sucrose, cellobiose, maltose, lactose); trisaccharides; and related compounds. Depending on how the hydroxy aliphatic residue is connected with the ammonia, one distinguishes for instance, amino sugars (2-amino glucose); aldehyde-ammonia sugars (glucose ammonia); the so-called osimines (d-glucosimine); the glucamines (d-glucamine). The number of organic derivatives of ammonia in which the organic part is related to such compounds is very large for even one compound. For instance, in case of the compound related to glucose, it is possible that the nitrogen containing group be attached to any one of six carbon atoms of the glucose structure. Many of these compounds have been described, for instance 1-amino glucose, 2-amino glucose, 3-amino glucose, 6-amino glucose. Other compounds are isoglucosamine, epiglucosamine, glucose ammonia, d-glucosimine, d-diglucosimine, ethylaminoglucose, dimethylaminoglucose, diethylaminoglucose. Many other variations are possible. Similar derivatives are known of other sugars and a few examples are listed, for instance, lactose ammonia, l-arabinosamine, d-l-fructosamine, d-dimannosimine, 6-aminogalactose, maltosimine. Many such compounds are obtained by the action of ammonia, or also substituted ammonias, on sugars. For others of such compounds more complicated methods of preparation are available. However, there exists often some doubt as to the actual structure of any one compound; and since any such compound may rearrange or condense in a number of ways, it is difficult to know which compound, or which mixture is actually in hand, or which product is formed during the preparation of the food to which the product may have been added. The ammonia derivatives of this invention may be produced by direct reaction of the ammonia with the polyhydroxy aliphatic compound, or by reaction of more complex compounds which produce the desired derivative, as in the formation of glycerylamine and d-glucosamine herein described. By the use of the staling-resistants of this invention all necessary resistance to staling can be effected without impairing the taste or condition or appearance of the food product.

Obviously, it is impossible to specify the exact manner of carrying out the invention in connection with every food product to which it applies, but examples are herein described which will indicate to those skilled in the preparation and handling of food products the manner in which the invention may be applied to various food products.

In general, in the practice of the invention the staling-resistant or anti-staling agent is included or incorporated in the food product preferably by incorporating or adding a small proportion thereof in such manner that it is dissolved or dispersed or infused in such liquid as is present, normally or otherwise, in the food product either during or after, or both, the preparation or completion of the food product; or by adding it to the exterior of a food product in which it cannot be dissolved or dispersed, such addition to the exterior of a product preferably being by the application of a solution or dispersion in order to obtain effective distribution throughout the surface of the product.

While numerous examples of the practice of this invention are given, it is to be understood that this invention is not limited thereto but that the examples are merely illustrative.

Two plain white cakes were made from the following recipe:

| | |
|---|---|
| Flour | 600 grams |
| Sugar | 600 grams |
| Butter | 224 grams |
| Milk | 488 grams |
| Eggs | 4 |
| Baking powder | 6 teaspoons |
| Vanilla extract | 2 teaspoons |
| Salt | 1 teaspoon |

In one batch of dough was included 0.6% by weight, dissolved in a little water, of staling-resistant consisting of the reaction product of ammonia and glucose, and in a control batch was included a similar quantity of water but none of the reaction product. These were baked for approximately the same length of time with an oven temperature of 175° C. After baking, the cakes were cut in sections which were wrapped and sealed in waxed paper. Samples were opened from time to time and compared. Cake containing the staling-resistant was much superior in flavor and appearance to the control sample, and retained an appreciable proportion of its freshness, even when two months old. The control sample of the same age was, from the standpoint of palatability, uneatable. The addition of staling-resistant to the cake preserved not only the freshness of taste, but also appearance and crumb structure. Additional batches, including batches containing 0.5% by weight of staling-resistant, on testing, confirmed this finding. In addition to organoleptic tests, samples were subjected to steam distillation and the total acidity and hydrogen-ion concentrations of the distillates determined. In every case the treated sample showed a very much lower total acidity and a much higher pH than did the untreated sample. This is an indication of the degree of changes brought about by oxidation. Fat was extracted with ether from treated and untreated samples of the cake over a month old, the ether was allowed to evaporate and over four months after extraction the fat from the treated cake retained an appreciable proportion of its fresh butter smell and that from the untreated cake was definitely rancid, showing the staling resistance imparted to the fat.

A sample of "Kellogg's Corn Flakes" was sprayed with a solution of the same staling-resistant containing sufficient material to add 0.6% by weight thereof to the sample. After spraying, the sample was dried in a vacuum oven and stored. An untreated sample also was stored for the same period of time. At first there was no appreciable difference between the samples, but after two to five weeks the untreated samples acquired an "old" flavor, while the treated corn flakes retained the original flavor. After a period of five months the treated sample still had an appreciable amount of its freshness, while the untreated sample was distinctly stale. In commercial production the anti-staling agent is incorporated before toasting of the flakes or other similarly prepared food.

An artificial vanilla extract was made up containing 2 grams vanillin, 2 grams coumarin, 10 grams caramel and 30 c. c. ethyl alcohol (95%) in two litres of solution, the balance being water. This formula follows very closely the general practice in the manufacture of artificial vanilla extract. This material was divided and to one of the 1 litre samples 6 grams of the same staling-resistant was added. Both samples were stored in stoppered bottles at room temperature. After a period of two weeks, the samples were compared. No appreciable differences had developed. As the storage period lenghtened to five weeks, the untreated sample acquired a flatness and later a bitter taste that was not present in the treated sample. Acidity measurements, both titratable and pH, showed a very marked difference between the two samples, the treated sample being faintly basic in character, while the untreated sample was distinctly acid. Any ammoniacal odor that developed in the treated material was dissipated by mild heating.

Two batches of doughnut dough were prepared using the following recipe:

| | |
|---|---|
| Flour | 560 grams |
| Sugar | 200 grams |
| Fat | 25 grams |
| Milk | 240 c. c. |
| Salt | 1 teaspoon |
| Baking powder | 2 tablespoons |
| Nutmeg, ground | 0.4 grams |
| Cinnamon, ground | 0.4 grams |
| Eggs | 2 |

To one batch was added in solution in the milk, 0.5% by weight of the dough, of the reaction product of glucose and ammonia. Doughnuts from both batches were cooked for the same length of time, i. e., 3 minutes, at 180° C. No difference in cooking could be determined, and there was no difference in taste when freshly made. After three days the treated doughnuts possessed their fresh-doughnut flavor but the untreated doughnuts had lost it. After two and one-half weeks the doughnuts had dried to the point where they were extremely difficult to eat, but on reconditioning these in an oven it was found that there was a distinct advantage in the use of the staling-resistant. The treated sample had retained much of its original freshness, whereas the other sample was stale. Additional experiments confirmed these results.

Two batches of bread dough were made up from the following recipe:

| | |
|---|---|
| Flour | 800 grams |
| Yeast, "Fleischmann's" | 1½ cakes |
| Sugar | 24 grams |
| Salt | 12 grams |
| Lard | 14.8 grams |
| Water | 512 c. c. |

To one batch of dough was added, in solution in the water, 0.5% by weight of the reaction product of glucose and ammonia, and to the other none was added. The doughs were mixed, proofed, and baked under the same conditions. Unfortunately, in storing bread there is a distinct tendency to mold, but loaves from each batch were stored both unwrapped and wrapped and sealed in waxed paper. Samples were tasted at various intervals. In every case there has been noticed an improvement in the bread when the staling-resistant has been used. It has been noticed that the bread containing the staling-resistant browned much more readily and also gave a larger volume of loaf than did the untreated bread and such bread toasts more rapidly and uniformly. In every baking rolls were made with the same dough, and the untreated rolls became stale very much more rapidly than did those containing the staling-resistant.

The characteristics determining freshness or staleness are unusually difficult to enumerate in connection with bakery products and especially those containing little or no shortening, such as bread and rolls. These products have a characteristic fresh smell and taste when first made which may be characterized as a fresh-crust smell or taste. In ordinary bread that important characteristic disappears before the product begins to acquire the taste or smell ordinarily associated with staleness. Bread treated in accordance with this invention retains its fresh-crust taste and smell four or more times as long, for example 8 days, as does ordinary bread, and retains it even after there is present in the treated bread some suggestion of that type of staleness which is readily observable in ordinary bread that is about four days old. Bread embodying this invention carried a definite suggestion of fresh bread even when three to four weeks old although common characteristics of staleness were also present. It has been found possible to recondition treated rolls (as by heating in a paper bag) to absolute freshness which were 4 to 6 days old, and to recondition to a state of palatability treated rolls which were 4 weeks old, but untreated rolls more than 2 days old could not be reconditioned to absolute freshness. Treated rolls have been found to be free of ordinary staleness twice as long (6 days) as untreated rolls. Treated rolls and bread do not acquire a very stale condition until two to three times the age (5 to 8 days) at which untreated bread and rolls reach such condition. Treated bread and rolls retain their absolute freshness twice as long (about 2 days) as untreated bread and rolls.

The reaction product of glucose and ammonia was added to two samples of heavy cream respectively in the proportions, by weight, of 0.5% and 1%. This did not affect the flavor of the cream. The presence of the agent in the cream inhibited staling. Cream containing the agent whipped well, and was usable, after more than two weeks' storage in a refrigerator maintained at ordinary operating temperature. The use of staling-resistant in sweet cream has three effects. In the first place, it retards the onset of the cheesy flavor common to "old" cream. In addition, it has a tendency to stabilize the viscosity, and it also retards the increase of acidity. The following results were obtained upon mixing and after an interval of ten days:

| Samples | Viscosity | | Acidity as percent lactic acid | |
|---|---|---|---|---|
| | Before | After | Before | After |
| 0.5% | 47.8 | 81.6 | 0.093 | 0.15 |
| 1.0% | 49.6 | 97.8 | 0.069 | 0.10 |
| Untreated | 45.2 | 103.6 | 0.105 | 0.27 |

Samples of orange juice from Florida oranges were prepared by two different methods. In one case the oranges were peeled and cored before using, so that there would be no oil from the skin in the juice. In the other case oranges were merely halved and squeezed. To separate samples from each batch 0.1, 0.3 and 0.5%, by weight, of the same agent was, respectively, added. To all samples, including the control, 0.1% of sodium benzoate was added to prevent fermentation. After two days' storage in a refrigerator the samples containing the agent were distinctly better in flavor, whereas the untreated sample had the taste that is usually associated with orange juice prepared "the day before". This beneficial effect was particularly noticeable in the samples containing the oil. These had a much better flavor than the ones expressed from the peeled and cored fruit. After two more days the favorable effect of the anti-staling compound was even more pronounced. The treated samples did not develop any undesirable terpene-like flavor and retained a large measure of their original freshness, whereas the control samples were decidedly stale. Treated samples stored twenty-two days had merely lost flavor and that was entirely restored by simple addition of a small quantity of citric acid. Fresh samples of orange juice treated with similar quantities of the reaction product of glucose and ammonia which had been neutralized with citric acid had a flavor after six days which could not be distinguished from that of fresh orange juice while untreated samples were distinctly flat and stale after six days and could not be rendered useful by addition of citric acid.

Freshly-opened oysters were stored in quart tinned cans. To separate samples 0.5 and 0.75% by weight, respectively, of the reaction product of glucose and ammonia was added. The staling-resistant has three effects on oysters in that it prolongs the period of absolutely fresh taste from a few hours to at least a day; definitely retards putrefaction in that even after more than two weeks the treated samples never attain the disgusting state attained by the untreated oysters in eight days, and the treated oysters did not acquire until more than two weeks the fishy odor and taste possessed by the untreated oysters after one week or less; and the distinctive metallic taste that was encountered in untreated oysters after forty-eight hours was not found in the treated samples. Clams were treated with similar results. Also, oysters and clams were treated with the reaction product of glucose and ammonia which had been neutralized with hydrochloric acid and the beneficial results were more pronounced and no ammoniacal odor occurred to conceal the inception of staleness. Both treated oysters and clams retained the average conception of freshness for three days while the untreated oysters and clams retained such freshness no more than a day. This is an example of retarding decomposition due to bacteria that develops in the absence of oxygen.

Inasmuch as the conversion of glucose to an ammonia derivative is not always quantitative, and since the further purification is not always necessary, the amount of agent given in the above examples has been estimated from the nitrogen content, where an impure product was used.

"Santos" coffee was treated with the reaction product of glucose and ammonia, by spraying thereon a solution of high concentration and used in such quantity as to add to the coffee 0.5% to 1.0% on the weight thereof, of the reaction product of glucose and ammonia. The samples were dried after spraying. Control samples were made. Some samples were treated before roasting, others after roasting and before grinding the bean, and other samples were treated after roasting and grinding the bean. The freshly prepared treated samples did not show any "off-flavor". After 10 days cup-test comparisons with untreated samples showed that the sample treated after roasting and before grinding was the best. To accelerate the test similar samples were placed in bottles which had previously been swept out with oxygen and the samples were shaken in those bottles for one minute while a stream of oxygen was passed through the bottle. At the end of that period a stopper was inserted and sealed with paraffin in each bottle. The oxygen treatment was repeated after 16 hours and the samples were stored for 6 days. All samples showed some staleness but the treated ones were very noticeably less stale than the control samples. A control sample stored in the form of the bean was unusable. Another set of samples of the same coffee was prepared by treating prior to roasting and storing samples of ground and unground treated coffee in an atmosphere of oxygen under pressure at a temperature of 37.5° C. After three days all samples showed staleness more pronounced than in the above case but the treated samples were distinctly better than the untreated samples. The effects of the staling-resistant are enhanced if the staling resistant is neutralized before application.

Separate samples of fresh butter were treated by working into them such quantity of concentrated solution of the reaction product of glucose and ammonia as to add to the respective samples 0.5% and 0.33%, on the weight of the butter, of the reaction product; and after about four weeks in an ordinary refrigerator both treated samples were unchanged in color, usable, and substantially superior in taste to the untreated control sample which had darkened and, while not entirely rancid, had definitely an "old" taste. Other samples were stored in an atmosphere of oxygen for three days, care being taken to avoid any possibility of overheating. The peroxide numbers, determined after three days by the method of Lowen, Anderson and Harrison, Journal of Industrial Chemistry, 29, pp. 151–156, February 1937, expressed as c. c. of normal sodium thiosulphate per 1000 gr. of butter, are given in the following table:

| Sample | Peroxide values |
| --- | --- |
| 0.33% | 1.44 |
| 0.5% | 1.62 |
| Untreated | 2.04 |

Both fresh nutmeats and salted nutmeats were treated by soaking in a concentrated solution of the reaction product of glucose and ammonia, the soaking being performed before salting. After 44 days the treated nuts were still good but the untreated control samples became stale in 28 days and rancid in 44 days as well as definitely bitter. In tests of some nutmeats, e. g. walnuts, a slight off-taste appeared in the treated nutmeats at about the end of 10 days but disappeared entirely 2 or 3 days later.

Eggs, before they were 24 hours old, had added to them about 0.5% by weight of the reaction product of glucose and ammonia, by spraying a water solution thereof upon the eggs, catching all drippings and re-spraying therewith. A control sample was treated with an equivalent amount of water. The eggs stood at a temperature varying between 58 and 72° F. without being covered or protected against changes in temperature. After 5 weeks the treated eggs still possessed an appreciable proportion of their freshness and were comparable to what normally passes for fresh eggs in city restaurants and to eggs sold in stores as "Grade 'A'" eggs. The untreated eggs were definitely stale. The treated eggs poached well and were of good quality. The white of the untreated eggs lost viscosity and tended to disintegrate during poaching and the untreated eggs were not of good quality, either in taste or appearance, when cooked. Treatment of canned broken eggs with the reaction product showed definite beneficial effect. Occurrence of a fishy odor may be avoided by use of a salt or ester of the product.

Soy bean oil was treated with the reaction product of glucose and ammonia by dissolving 0.5% by weight thereof in water, using 1 cc. of water to each 100 cc. of oil, and emulsifying the solution with the oil by shaking. Peroxide values, obtained as above stated, indicated less oxidation after 10 days for the treated oil. Oxygen was passed through some samples at room temperature for an hour and the peroxide numbers indicated that the treatment had a definite inhibitory effect upon the formation of peroxide as follows:

| Sample | Peroxide values | | |
|---|---|---|---|
| | Before $O_2$ | After $O_2$ | Increase |
| 0.5% | 10.5 | 10.7 | 0.2 |
| Untreated | 17.4 | 20.0 | 2.6 |

Cottonseed oil, obtained under the trade name "Wesson" Oil, was treated in the same manner and the peroxide numbers before and after treatment with oxygen for an hour were as follows:

| Sample | Peroxide values | | |
|---|---|---|---|
| | Before $O_2$ | After $O_2$ | Increase |
| 0.5% | 17.5 | 18.5 | 1.0 |
| Untreated | 19.3 | 22.7 | 3.4 |

Olive oil, subjected to the same treatment, with the reaction product and with oxygen, gave the following results:

| Sample | Peroxide values | | |
|---|---|---|---|
| | Before $O_2$ | After $O_2$ | Increase |
| 0.5% | 14.0 | 14.8 | 0.8 |
| Untreated | 16.1 | 17.1 | 1.0 |

Lard was melted and 0.5% by weight of the reaction product of glucose and ammonia was added and the lard was stirred until cold to prevent any settling. The samples were wrapped in wax paper and stored in a refrigerator for 16 days and the peroxide values were then as follows:

| Sample | Peroxide values |
|---|---|
| 0.5% | 2.06 |
| Untreated | 2.27 |

Fresh samples of lard made up with care to avoid overheating were stored in an atmosphere of oxygen for 3 days at room temperatures after which the untreated sample had a slightly stale odor and taste and the treated sample was fresh, the peroxide values being as follows:

| Sample | Peroxide values |
|---|---|
| 0.5% | 1.41 |
| Untreated | 2.11 |

Various types of crackers were made under identical conditions, including in the dough of some of them 0.5% by weight of the reaction product of glucose and ammonia. The finished crackers were stored in closed containers and in open pans for several weeks. In every case observations from time to time showed that the treated crackers were noticeably fresher, this effect being most noticeable in crackers having a higher percentage of shortening, e. g., the "Butter Thin" type. The untreated sample of the "Butter Thin" type in closed jars was definitely rancid after 3 weeks' storage, but the treated sample was fresh after 5 weeks.

Samples of coating, milk and vanilla types, of "Peter Cailler Kohler" chocolate were separately melted and 0.5% by weight of the reaction product of glucose and ammonia was added in dry form and the chocolate was cast into bar form. 24 days after storage at room temperature the treated samples were definitely superior in odor and taste and had none of the harshness associated with stale chocolate.

To two samples of "Chesterfield" cigarettes the reaction product of glucose and ammonia was added to the extent of 0.33% and 0.5% by weight, respectively, by adding solutions of the reaction product with a hypodermic needle and drying the cigarettes in a vacuum at room temperature. One month after treatment the treated samples were found by all of three observers to be fresher in taste, to produce less acrid smoke, and to be free of stale flavor that was noticeable in untreated samples of the same age. To "Haddon Hall" cigars 0.5% by weight of the reaction product of glucose and ammonia was added by spraying a solution on the cigars and drying them in a vacuum. After a month, the treated sample had a more pleasant odor and afforded a pleasanter smoke than the untreated sample. Treatment of the leaf before it is rolled into cigars is preferred. Three samples of bright-cured longleaf Virginia tobacco were treated respectively with 0.33%, 0.5% and 1.0% by weight of the reaction product of glucose and ammonia dissolved in water and sprayed on the tobacco, an equal amount of water being sprayed upon a control sample. All samples were dried in vacuum at room temperature. After 32 days' storage in closed jars equipped with moistening pads the treated sample tasted more bland and was free of bitterness that was very noticeable in the untreated sample. When smoked the treated sample was definitely superior and the untreated sample had a pronounced bite and was definitely acrid in the nasal passages, while the treated samples were smooth and pleasant.

Beneficial effects of the use of the reaction products of ammonia and glucose have been observed with tea, cornmeal, milk powder (especially when produced from whole milk), prepared mustard or mustard paste, mayonnaise (especially with acetic acid), and French dressing.

The fresh-cut surface of an apple provides a quick indication of the effectiveness of the staling-resistant or anti-staling agent used in the above tests and a quick indication for the effectiveness of various anti-staling agents of the class above mentioned. The fresh-cut surface of an apple was treated with a 1% aqueous solution of the reaction product of glucose and ammonia which product contained 6.0% nitrogen. The darkening of the treated surface was compared to that of a similar surface that had been wetted with water at the start of the test in order to have the conditions comparable. After one hour untreated surfaces were noticeably darker than the treated ones. After four hours the treated surfaces were still lighter than the untreated ones. In using a 1% solution of a similar agent having a 7% content of nitrogen, the treated pieces had not changed color after fifteen minutes, but the untreated surfaces had darkened noticeably. At the end of seventy-five minutes during which the untreated surfaces had continued to darken at about the same rate, the treated surfaces had only darkened to the same extent that the untreated surfaces had darkened in fifteen minutes.

Employing the apple test, aqueous solutions of various materials were applied to separate freshly-cut pieces of apple and the discoloration was noted in comparison with untreated similar surfaces. A 2% aqueous solution of the reaction product of glucose and ammonia which had been standing for a week was found to give positive results and the hydrochloride salt of d-glycosamine or 2-aminoglucose or chitosamine, obtainable by reacting chitin with hydrochloric acid, which is different from the hydrochloride salt of the reaction product of glucose and ammonia, gave positive results. Also, glycerylamine (made from glycerine monochlorhydrin and sodium amide and containing only 3.4% of nitrogen instead of the theoretical 15.4%, and therefore impure), aminolactose and aminodextrose all gave positive results in spite of the impurity of the glyceryl-amine. The glyceryl-amine was more effective than glycerine alone. By the same test acetate of aminolactose and acetate of aminoglucose gave positive results. The reaction product of glucose and ammonia was treated with oleic acid in order to obtain a higher fatty acid salt. The reaction product was taken up in alcohol and after evaporation of the alcohol was found to be soluble in olive oil and dispersable in water. When applied in 1% water dispersion, it was effective in the test on freshly-cut surfaces of apples. Dextrose and lactose give slightly positive results, but their amino derivatives, and especially the salts thereof, are substantially more effective.

The discoloration of fruit during storage, and especially of cut fruit, is a serious problem and this invention provides a solution for that problem.

The fact that the compounds useful in this invention may not only be used in the free form, but are also found to be effective when partly or completely reacted with acids or suitable related products, has appreciable value. Taste is of course a function of pH, and in cases where the taste or flavor is rather sensitive to pH changes it is indicated to use any of the compounds operative in this invention under pH conditions which are adjusted to the particular food or the application of the staling-resistant thereto.

While it is impossible to specify the most desirable form and quantity of staling-resistant to be employed, the foregoing will give one skilled in the handling of food products sufficient information to choose the material and the proportions most suitable under the circumstances. It may be noted, however, that substantial staling-resistance has been obtained by proportions as low as 0.1% and that the addition of 1.0% to cream, a food of extremely delicate flavor and of high susceptibility to outside influences, has not impaired the taste thereof when tested, for example, 24 hours after the addition. Without limitation thereto, a range of 0.1% to 1.0% by weight would include most cases, with 0.4% to 0.6% optimum for many instances.

I claim:
1. A food product, normally subject to staling, that is staling-resistant and non-deleterious and carries a small amount of a product of the direct reaction of an aldose with ammonia.
2. A food product, normally subject to staling, that is staling-resistant and non-deleterious and carries a small amount of a product of the direct reaction of ammonia with glucose.
3. A food product, normally subject to staling, that is staling-resistant and non-deleterious and carries a small amount of glucosimine.
4. A food product, normally subject to staling, that is staling-resistant and non-deleterious and carries a small quantity of a neutralized product of the direct reaction of an aldose with ammonia.
5. A bakery food product that is non-deleterious and carries a small amount of water-soluble aldehyde sugar derivative of ammonia.
6. A bakery food product to which has been added a small quantity of staling-resistant comprising glucosimine.
7. A bakery food product to which has been added a small quantity of the product of the direct reaction of glucose and ammonia.
8. Roasted coffee to which has been added a non-toxic quantity of a product of the direct reaction of an aldose with ammonia.
9. Roasted coffee to which has been added a non-toxic quantity of a reaction product of an aldose and ammonia.
10. The process of preparing a food product, normally subject to staling, which comprises adding thereto a staling-resistant comprising a non-toxic quantity of an organic product of the direct reaction of ammonia with an aldose.
11. The process of rendering resistant to staling a food product normally subject to staling which comprises adding thereto a non-toxic quantity of an unstable organic product of the direct reaction of glucose with ammonia.
12. In a process of preparing a staling-resistant bakery food product the step which comprises including in the ingredients thereof prior to baking a water-soluble unstable product of the direct reaction of an aldose with ammonia.
13. The process of rendering citrus fruit juice resistant to staling which comprises adding thereto a non-toxic quantity of water-soluble product of the direct reaction of glucose with ammonia the said reaction product being neutralized by addition of citric acid.

EMIL OTT.